United States Patent [19]
Otaka et al.

[11] Patent Number: 5,463,221
[45] Date of Patent: Oct. 31, 1995

[54] ELECTRON BEAM MEASURING APPARATUS

[75] Inventors: Tadashi Otaka; Hiroyoshi Mori, both of Katsuta; Hideo Todokoro, Tokyo, all of Japan

[73] Assignee: Hitachi, Ltd., Tokyo, Japan

[21] Appl. No.: 216,288

[22] Filed: Mar. 23, 1994

[30] Foreign Application Priority Data

Mar. 23, 1993 [JP] Japan .................................. 5-086904

[51] Int. Cl.⁶ .................................................. H01J 37/28
[52] U.S. Cl. ............................................ 250/310; 250/307
[58] Field of Search .................................. 250/306, 307, 250/310

[56] References Cited

U.S. PATENT DOCUMENTS

| | | | |
|---|---|---|---|
| 4,600,839 | 7/1986 | Ichihashi et al. | 250/310 |
| 5,029,250 | 7/1991 | Komatsu et al. | 250/307 |
| 5,051,585 | 9/1991 | Koshishiba et al. | 250/306 |
| 5,126,566 | 6/1992 | Shimada | 250/307 |
| 5,254,854 | 10/1993 | Betzig | 250/306 |

Primary Examiner—Jack I. Berman
Assistant Examiner—James Beyer
Attorney, Agent, or Firm—Antonelli, Terry, Stout & Kraus

[57] ABSTRACT

When an image display unit displays a magnified image of an object being examined, a measuring unit automatically computes the dimensions of the image at the preset position. A tolerance range setting unit has been supplied with an upper and a lower limit value according to which it can judge the dimensions of the object at the preset position to be normal, whereas a comparison-decision unit decides that the dimensions thus computed are held between the upper and lower limit values. When the measured result is found outside the range of upper to lower limit values, the right-or-wrong decision data is stored in a memory and is redisplayed in the form of an image by the image display unit at proper timing.

8 Claims, 3 Drawing Sheets

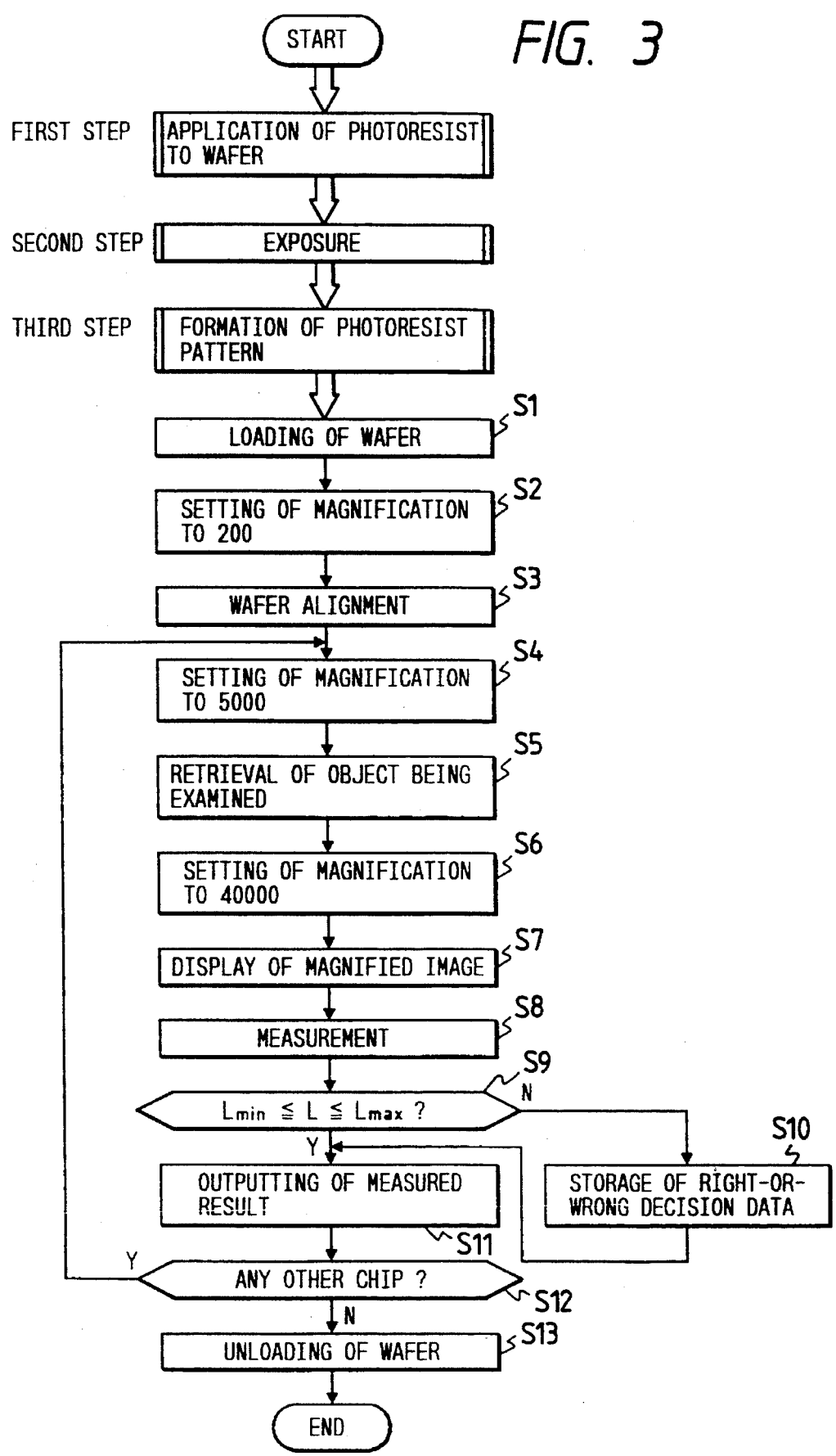

ELECTRON BEAM MEASURING APPARATUS

BACKGROUND OF THE INVENTION

The present invention relates generally to electron beam measuring apparatus and more particularly to an electron beam measuring apparatus fit for use in automatically measuring the dimensions of a microscopic pattern on a semiconductor chip during the process of manufacturing semiconductor devices.

Electron beam measuring apparatus have been used for measuring the width of circuit patterns and the diameters of contact holes during the process of manufacturing semiconductor devices.

When desired circuit patterns are formed by etching conductive films such as metal films, semiconductor films or the like deposited on the surfaces of semiconductor wafers, for example, the photographic exposure technique is utilized for forming a photoresist pattern on the surface of a conductive film beforehand and the conductive film is then etched with the photoresist pattern as a mask.

The width and diameter of the photoresist pattern are measured by an electron beam measuring apparatus after the pattern is formed, so that the pattern having nonstandardized dimensions and diameter is prevented from being passed through the etching process. Those having nonstandardized dimensions and the like are sent back to the preceding process setup after their photoresist patterns are peeled off so as to form respective patterns again.

In operation, about five sheets of wafers in total are first selected from one lot (of e.g., 26 sheets) and measurement is automatically made of pattern width and hole diameter in the principal part of each chip arranged in the corner or central portion of each wafer. If any one of the chips is found out of the standard, all wafers in that lot are sent back to the preceding process step where each one is provided with a photoresist pattern again.

Due to the following reasons, the measured results have been known to admit errors in cases where electron beams are used for automatic measurement:

(1) Image is out of focus;
(2) The bottom edge cannot be identified as the contrast is lowered by the charged surface of a sample especially when the hole diameter is measured; and
(3) Starting or terminating point of measurement is misjudged as a foreign substance may be taken as an edge.

The measured results which are outside the range of tolerance do not always signify that the dimensions of the photoresist pattern and the hole diameters are unusual. However, preference has hereto fore been given to measured results, which is problematical in that even those actually within the range of tolerance are regarded as nonconforming.

SUMMARY OF THE INVENTION

An Object of the present invention made to solve the foregoing problems characteristic of the prior art is to provide an electron beam measuring apparatus capable of making it possible to judge measured results right or wrong even when the automatically measured results are outside the range of tolerance.

In order to accomplish the object above, the electron beam measuring apparatus of the present invention provides a right-or-wrong decision data memory and a redisplaying unit, when measured result is found outside a predetermined range, the right-or-wrong decision data is stored in the memory, and then the right-or-wrong decision data is redisplayed in the form of an image by an image display unit at proper timing.

Other and further objects and features of the invention will appear fully from the following description.

BRIEF DESCRIPTION OF THE DRAWINGS

FIG. 3 is a flowchart showing the operation of the embodiment of the present invention.

DESCRIPTION OF THE PREFERRED EMBODIMENTS

Figure 1:
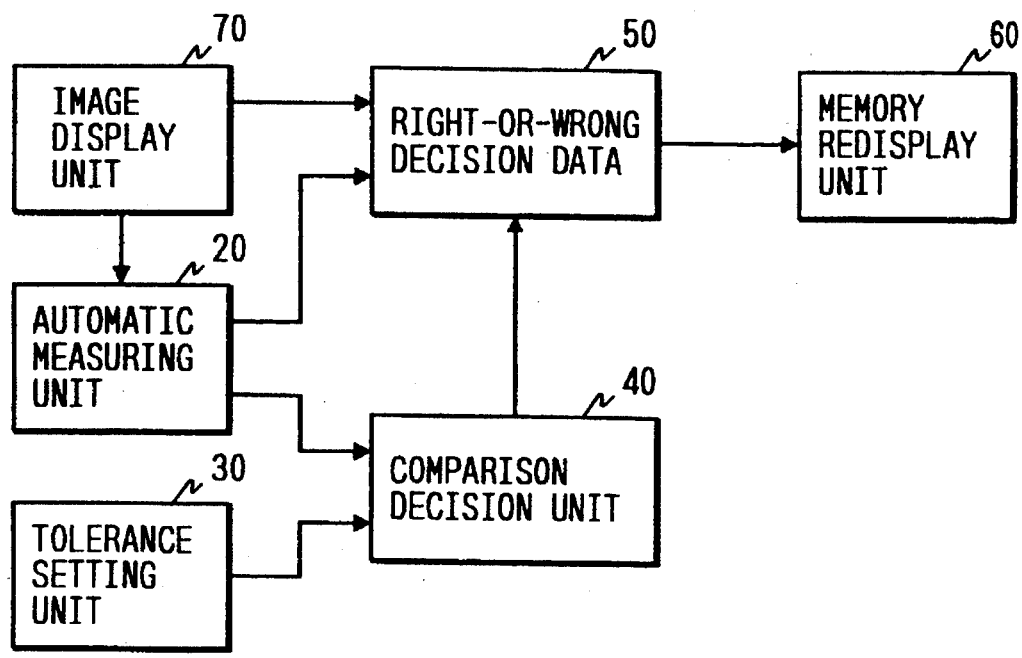
FIG. 1 is a functional block diagram illustrating an arrangement of principal components according to the present invention.

Referring to the accompanying drawings, the present invention will subsequently be described in detail. FIG. 1 is a functional block diagram illustrating an arrangement of principal components according to the present invention.

In FIG. 1, an image display unit 70 displays a magnified image of an object being examined such as a circuit pattern on a semiconductor chip, and contact holes; an automatic measuring unit 20 automatically measures the dimensions of the magnified image at a preset position, the image being displayed by the image display unit 70; and a tolerance range setting unit 30 sets a range of tolerance for dimensions at the preset position.

A comparison-decision unit 40 compares the measured result from the automatic measuring unit 20 with the range of tolerance set by the tolerance range setting unit 30 to decide whether the measured result is within the range of tolerance. A right-or-wrong decision data memory 50 stores, for example, the magnified image of the object being examined, data indicating a point to be examined (e.g., a line profile). A redisplay unit 60 displays the right-or-wrong decision data stored in the data memory 50. The redisplay unit 60 can use a display unit of image display unit 70 in common.

When the image display unit 70 displays the magnified image of the object being examined with the arrangement above, the automatic measuring unit 20 automatically computes the width of the pattern and the diameter of the contact hole arranged at the preset position by detecting the edge-to-edge distance thereof.

The tolerance range setting unit 30 has been supplied with upper and lower limit values according to which it can judge the dimensions of the object at the preset position to be normal, whereas the comparison-decision unit 40 decides whether the edge-to-edge distance computed by the automatic measuring unit 20 is held between the upper and lower limit values (the range of tolerance).

When the edge-to-edge distance is found being held between the upper and lower limit values according to the decision thus made, the right-or-wrong judgment data memory 50 stores the image of the object being examined as what is intended for the detection of the edge and an edge detection signal (the line profile) as right-or-wrong. The right-or-wrong decision data thus stored can be displayed in the form of an image by the redisplay unit 60 at proper timing.

Figure 2:
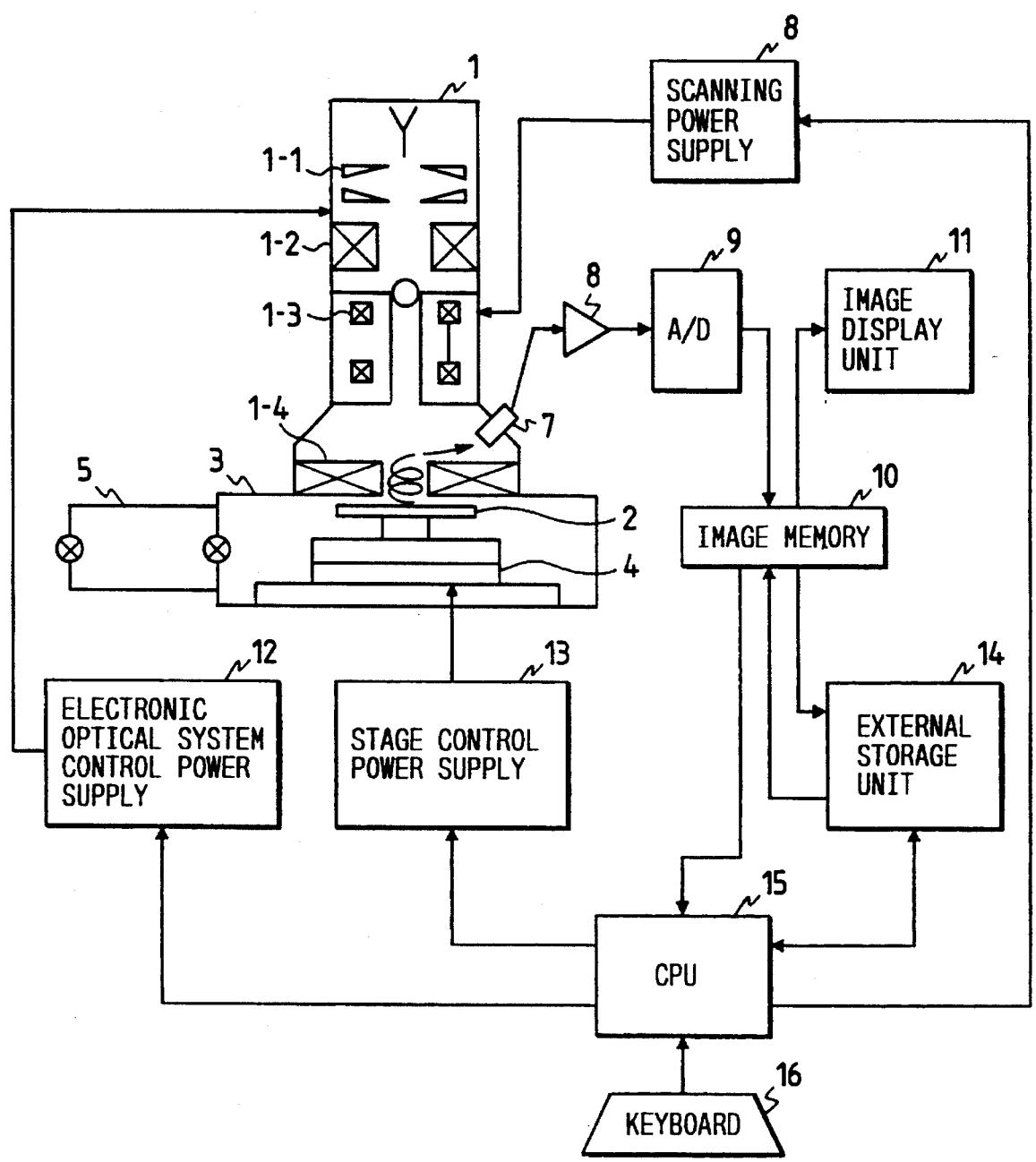
FIG. 2 is a block diagram of an electron beam measuring apparatus embodying the present invention.

FIG. 2 is a block diagram illustrating a construction of an electron beam measuring apparatus embodying the present invention.

In FIG. 2, an electron gun 1-1, a converging lens 1-2, a deflecting coil 1-3 and an objective lens 1-4 constitute an electronic optical system 1, whereas an electronic optical system control power supply 12 and a scanning power supply 6 are used to supply power to each of them.

Electron beams finely converging in the electronic optical system are used for two-dimensional scanning on a wafer 2 mounted on a sample stage 4. The power used to drive the sample stage 4 in every direction is supplied by a stage control power supply 13 to be controlled by CPU 15.

Secondary electrons radiated from a microscopic pattern on the surface of the wafer 2 in response to the electron beams thus irradiated are detected by a secondary electron detector 7. The signal thus detected is amplified by a video amplifier 8 before being converted by an A/D converter 9 to digital data, which is then stored in an image memory 10.

On the other hand, a scanning area of the electron beams on the wafer 2 is determined by the host CPU 15 for properly setting the output of the scanning power supply 6 on the basis of the magnification entered beforehand via a keyboard 16.

CPU 15 reads the image data stored in the image memory 10, makes use of the known pattern recognizing technique to recognize the position of the object being examined and takes measurements based on the results of detection of the edges at that position and the magnification value. In other words, CPU 15 measures the distance between the edges detected. Incidentally, the image data read from the image memory 10 is sent to an image display unit 11 where it is displayed on a cathode ray tube, for example.

An external storage device 14 is connected to the image memory 10 and CPU 15 instructs the external storage device 14 to store the image data stored in the image memory 10 or the measured results computed by CPU 15.

The data on the measured results and the like may be read from the external storage device 14 under instructions from PTU 15 before being fed via the image memory 10 to the image display unit 11. Moreover, these data may be arranged so that they are displayed on another character display unit.

A detailed description will subsequently be given of the operation of the present embodiment by taking it as an example to perform measurement for evaluating a photoresist pattern after the pattern for etching is formed on the surface of a semiconductor wafer.

FIG. 3 is a flowchart showing the operation of the present embodiment, wherein steps 1–3 represent those of processing a wafer.

At step 1, photoresist is applied onto the whole surface of the semiconductor wafer.

At step 2, the surface of the photoresist is exposed to light via mask.

At step 3, a desired photoresist pattern is formed through the development process.

The semiconductor wafers with the photoresist patterns formed on their respective surfaces in that way are received by cassettes, each of which contains 25 sheets of them, and sent to the next step of evaluation. In this case, the description of the present embodiment is based on the assumption that one cassette (containing 25 sheets of wafers) is equivalent to one lot in the process of manufacture.

At the step of evaluation, the semiconductor wafers 2 are sent from a loader chamber 5 (FIG. 2) one after another and loaded onto the sample stage 4 in a sample chamber 3 at step S1.

At step S2, the scanning power supply 6 is controlled by CPU 15 so as to align the coordinate system of the sample stage 4 with that of the semiconductor chip on the wafer 2 (hereinafter called "wafer alignment") and the scanning range of the electron beam is set in a manner which makes available a magnified image about 200 times greater, for instance. At step S3, automatic origin correction and chip rotation correction are made to implement the wafer alignment.

In order to implement the wafer alignment, a model image of a mark for wafer alignment and the schematic position of the mark for wafer alignment on the wafer 2 are prestored in the external storage device 14 so that CPU 15 may search for the same image as the model image in the magnified image of the wafer 2.

When the wafer alignment is completed, a magnification of about 5,000 is set to select a preset chip to be examined by means of pattern recognition and further autofocusing is conducted at step S4.

At step S5, the pattern recognition based on the magnified image about 5,000 times greater is effected and CPU 15 finds a preregistered model image out of the wafer 2 so as to select a chip to be examined.

At step S6, a magnification of about 40,000, for example, is set to measure a preset point within the chip and autofocusing is conducted again. Moreover, the magnified image is stored in the image memory 10 after the autofocusing is completed. At step S7, that magnified image is read out of the image memory 10 and displayed on the image display unit 11.

At step S8, the edges of a pattern being examined is detected with respect to the magnified image displayed on the image display unit 11 and the edge-to-edge distance is automatically measured. At step S9, CPU 15 decides whether the measured result L is held between a preset upper limit value Lmax and a lower limit value Lmin. If the measured result L is decided outside the range of tolerance, the magnified image displayed on the image display unit 11, that is, what has been stored in the image memory 10 is stored in the external storage device 14 as the data based on which the operator is allowed to judge later whether that decision is right or wrong at step S10.

If sample recognizing data and measuring (observing) conditions are stored together with the image data, image retrieval that follows will be facilitated. The sample recognizing data in this case means to include the kind of the sample, lot and batch names to which it belongs, a process step at which the photoresist pattern is to be formed and the like, whereas the measuring conditions mean an acceleration voltage, a probe current, magnification, a visual field position and the like. At step S11, the measured result is output.

At step S12, a decision is made on whether any other chip to be sample exists on the same wafer and if there exists such a chip thereon, the flow of the process is returned to step S4 and the aforementioned process steps are repeated. When all the chips to be sampled are completely examined, the wafer 2 is unloaded and the evaluation of the other chips is terminated at step S13.

If any spot on any one of the wafers if found outside the range of tolerance after the termination of evaluation of the preset number of sheets (e.g., five sheets) out of 25 sheets per case, the operator is informed of the fact that the case in question contains a nonconforming lot as it is displayed or alarmed by an appropriate means.

When the measured result is decided outside the range of tolerance, the image data as what is used to judge whether the decision is right or wring is stored according to the present embodiment and it is therefore easily confirmable whether the decision is right or wring or whether the decision is wrong as it originates from the malfunction of the apparatus out of focus.

In other words, any lot that has been judged defective only because of the malfunction of the apparatus though the chip itself is normal may be reevaluated by reexamining it.

Although a description has been given of a case where the magnified image is to be immediately stored once the measured result at each measuring point is decided outside the range of tolerance according to the present invention, it may also be acceptable to store the magnified image only when every measured result is found outside the range of tolerance after the point involved is repeatedly examined when the measured result is outside the range of tolerance.

Figure 4:
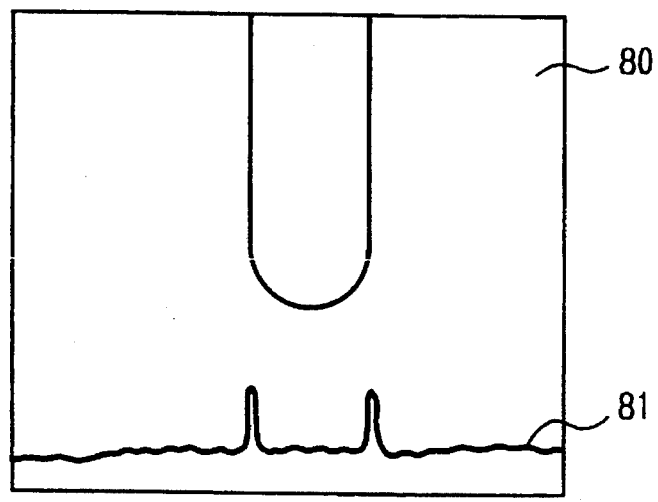
FIG. 4 is a diagram illustrating right-or-wrong data by way of example.

Although a description has been given of a case where the magnified image is to be stored as the right-or-wrong decision data once the measured result is decided outside the range of tolerance according to the present invention, the present invention is not limited to the case thus exemplified. As shown in FIG. 4, for example, a line profile 81 indicating image contrast variations in the main scanning direction may be superposed on a magnified image 80 and displayed for storing purposes.

With this arrangement, the waveform of the line profile 81 may be used to determine the starting and terminating points of measurement with ease in a case where a foreign substance is mistaken for an edge. In such a case, the misjudgment may readily be confirmed.

Moreover, the line profiles resemble as far as measuring points are concerned on condition that measurement is accurately made when the same point of each chip is examined as in the embodiment shown. Even in the case of a defective photoresist pattern, moreover, the shifted quantity from the range of tolerance only remains at roughly several %. In a case where the lens profile anticipated during the time such measurement is accurately made becomes excessively different from what has bend detected actually, it may be judged as what is based on wrong measurement, not the nonconforming photoresist pattern.

It is also possible to make a similar decision only from the measured results of both cases. Further, it is apparent that when the peak value of the line profile thus detected is dull, the contrast may possibly be abnormal.

The right-or-wrong decision may be made by only storing a relatively small quantity of data including the line profile and measured results in place of the magnified image. The memory capacity can thus be saved.

As set forth above, the image as data for use in judging the decision right or wrong is stored when the measured result is decided outside the range of tolerance according to the present invention. If the operator displays the image at proper timing, it is easily confirmable whether the decision thus made is right or wrong or whether the decision thus made is right or wrong or whether the decision is wrong as it originates from the malfunction of the apparatus out of focus.

We claim:

1. An electron beam measuring apparatus comprising:

a measuring unit for measuring the dimensions of a magnified image of an object being examined with an electron beam so as to produce measured results;

a tolerance range setting unit for setting a range of tolerance for dimensions;

a comparison-decision unit for comparing said measured results with the range of tolerance set by said tolerance range setting unit and for deciding whether the measured results fall within said range of tolerance or not;

a right-or-wrong decision data memory for storing decision data to be used in judging whether the decision by said comparison-decision unit is right or wrong when the measured results have been found by said comparison-decision unit to be outside said range of tolerance; and a redisplaying unit connected with the right-or-wrong decision data memory for redisplaying the right or wrong decision data on an image display unit.

2. An electron beam measuring apparatus as claimed in claim 1, wherein the right-or-wrong decision data stored in said right-or-wrong decision data memory includes at least one of the following: the image of the object being examined, the measured results and a line profile.

3. An electron beam measuring apparatus as claimed in claim 1 or 2, wherein the right-or-wrong decision data is stored in said right-or-wrong decision data memory together with data for identifying an object being examined.

4. An electron beam measuring apparatus as claimed in any one of the claims 1 and 2, wherein the right-or-wrong decision data is stored together with measuring conditions.

5. An electron beam measuring apparatus as claimed in claim 1 or claim 2, wherein the measuring unit includes means for repeating a measurement a preset number of times after the initial measured results of the measurement have been found by the comparison-decision unit to be outside the range of tolerance, and wherein the right-or-wrong decision data memory stores data for judging whether the decision thus made in said preset number of measurements has been found to be outside the range of tolerance.

6. An electron beam measuring apparatus as claimed in claim 1, wherein said right-or-wrong decision data in said right-or-wrong decision data memory includes a representation of a line profile of an object being examined.

7. An electron beam measuring apparatus as claimed in claims 1 or 2, further including means, responsive to said comparison-decision unit determining that measured results produced by said measuring unit are outside said range of tolerance, for producing an indication of a non-conforming measurement to an operator.

8. An electron beam measuring apparatus as claimed in claim 1, wherein said tolerance range setting unit sets a range of tolerance for dimensions at a preset position.

\* \* \* \* \*